(12) United States Patent  
Oon et al.

(10) Patent No.: US 9,363,794 B1  
(45) Date of Patent: Jun. 7, 2016

(54) HYBRID ANTENNA FOR PORTABLE RADIO COMMUNICATION DEVICES

(71) Applicant: MOTOROLA SOLUTIONS, INC., Schaumburg, IL (US)

(72) Inventors: Alexander Chin Keong Oon, Bayan Lepas (MY); Giorgi Bit-Babik, Plantation, FL (US); Teik Yang Goh, Pulau Pinang (MY); Hiang Yaol Derrick Lim, Pulau Pinang (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/570,271

(22) Filed: Dec. 15, 2014

(51) Int. Cl.
  *H04B 1/40* (2015.01)
  *H04W 72/02* (2009.01)
  *H01Q 1/24* (2006.01)
  *H03H 7/40* (2006.01)
  *H04B 1/401* (2015.01)
  *H04M 1/725* (2006.01)
  *H04W 88/06* (2009.01)

(52) U.S. Cl.
  CPC ............. *H04W 72/02* (2013.01); *H01Q 1/243* (2013.01); *H03H 7/40* (2013.01); *H04B 1/401* (2013.01); *H04M 1/72563* (2013.01); *H04W 88/06* (2013.01)

(58) Field of Classification Search
  CPC .................................... H04B 1/18; H04B 1/40
  USPC ................................................. 455/77, 193.1
  See application file for complete search history.

(56) References Cited

U.S. PATENT DOCUMENTS

| 4,814,779 | A | * | 3/1989 | Levine | ..................... | H01Q 3/14 342/375 |
| 5,606,936 | A | * | 3/1997 | Davis | ................... | A01K 15/023 119/721 |
| 5,831,577 | A | * | 11/1998 | Nichols | .................... | H01Q 1/38 342/357.31 |
| 5,867,126 | A | * | 2/1999 | Kawahata | .............. | H01Q 1/243 343/700 MS |
| 5,973,648 | A | * | 10/1999 | Lindenmeier | ........ | H01Q 1/1271 343/700 MS |
| 6,072,435 | A | * | 6/2000 | Terashima | ........... | H01Q 1/1271 343/704 |
| 6,075,500 | A | * | 6/2000 | Kurz | ..................... | H01Q 1/084 343/895 |
| 6,160,571 | A | * | 12/2000 | Wang | ...................... | H04B 1/40 348/725 |

(Continued)

FOREIGN PATENT DOCUMENTS

| WO | 9718600 A1 | 5/1997 |
| WO | 0120716 A1 | 3/2001 |
| WO | 2013183056 A1 | 12/2013 |

*Primary Examiner* — Hai V Nguyen

(74) *Attorney, Agent, or Firm* — Scott M. Garrett

(57) ABSTRACT

A hybrid antenna structure allows the antenna to be used internally or mostly internally in a portable radio communication device operating in the VHF range. The hybrid antenna structure includes a switching circuit that connects an RF circuit to one of several points along the length of a wrapped conductor element, depending on the selected operating frequency. An inductive matching tail element is adjustably tuned to match the selected tap point on the wrapped conductor for the selected operating frequency.

20 Claims, 5 Drawing Sheets

(56) References Cited

U.S. PATENT DOCUMENTS

| | | | |
|---|---|---|---|
| 6,169,523 B1* | 1/2001 | Ploussios | H01Q 1/36 343/802 |
| 6,208,306 B1* | 3/2001 | McLean | H01Q 1/48 343/747 |
| 6,255,994 B1* | 7/2001 | Saito | H01Q 1/38 343/700 MS |
| 6,323,811 B1* | 11/2001 | Tsubaki | H01Q 1/243 343/700 MS |
| 6,337,667 B1* | 1/2002 | Ayala | H01Q 1/243 343/702 |
| 6,342,859 B1* | 1/2002 | Kurz | H01Q 1/242 343/700 MS |
| 6,342,869 B1* | 1/2002 | Edvardsson | H01Q 1/243 343/702 |
| 6,448,934 B1* | 9/2002 | Lee | H01Q 1/242 343/702 |
| 6,768,464 B1 | 7/2004 | Shoji et al. | |
| 6,836,248 B2* | 12/2004 | Fukushima | H01Q 1/242 343/700 MS |
| 7,046,201 B2* | 5/2006 | Okada | H01Q 1/22 343/700 MS |
| 7,164,387 B2* | 1/2007 | Sievenpiper | H01Q 1/243 343/700 MS |
| 7,260,424 B2* | 8/2007 | Schmidt | H01Q 1/241 343/702 |
| 7,286,599 B1* | 10/2007 | Cheah | H04B 1/71632 370/212 |
| 7,400,300 B2* | 7/2008 | Qi | H01Q 1/243 343/700 MS |
| 7,586,463 B1 | 9/2009 | Katz | |
| 7,610,070 B2* | 10/2009 | Schmidt | H01Q 1/241 343/702 |
| 7,639,188 B2* | 12/2009 | Ying | H01Q 1/243 343/702 |
| 7,642,969 B2* | 1/2010 | Nam | H01Q 1/243 343/700 MS |
| 7,652,637 B2* | 1/2010 | Taki | H01Q 1/2225 343/700 MS |
| 7,705,787 B2* | 4/2010 | Ponce De Leon | H01Q 1/52 343/700 MS |
| 7,733,271 B2* | 6/2010 | Moon | H01Q 9/0421 343/700 MS |
| 7,852,283 B2* | 12/2010 | Eide | H01Q 1/3275 343/715 |
| 7,876,227 B2* | 1/2011 | Bellows | H01Q 1/2216 340/10.42 |
| 7,911,387 B2* | 3/2011 | Hill | H01Q 1/243 343/700 MS |
| 8,081,116 B2* | 12/2011 | Yoshioka | H01Q 9/40 343/700 MS |
| 8,130,166 B2* | 3/2012 | Ayala | G06K 7/10178 307/104 |
| 8,144,064 B2* | 3/2012 | Milosevic | H01Q 9/145 343/703 |
| 8,164,526 B1 | 4/2012 | Aula et al. | |
| 8,294,524 B2* | 10/2012 | Pellon | H03M 1/662 331/46 |
| 8,344,952 B2* | 1/2013 | Yi | H01Q 1/2283 343/700 MS |
| 8,564,495 B2* | 10/2013 | Leem | H01Q 9/0414 343/702 |
| 8,587,494 B2* | 11/2013 | Lee | H01Q 1/243 343/700 MS |
| 8,618,990 B2* | 12/2013 | Somero | H01Q 9/42 343/702 |
| 8,810,469 B2* | 8/2014 | Kim | H01Q 1/241 343/846 |
| 8,831,073 B2* | 9/2014 | Kawasaki | H04B 1/40 375/219 |
| 8,909,182 B2* | 12/2014 | Milosevic | H01Q 1/242 343/745 |
| 8,928,530 B2* | 1/2015 | Achour | H01Q 5/0024 343/700 MS |
| 8,947,302 B2* | 2/2015 | Caballero | H01Q 1/243 343/702 |
| 9,013,307 B2* | 4/2015 | Hussain | G06K 7/10178 340/572.1 |
| 9,037,200 B2* | 5/2015 | Yoon | H01Q 1/50 343/702 |
| 9,041,617 B2* | 5/2015 | Sorensen | H01Q 7/005 343/745 |
| 9,070,965 B2* | 6/2015 | Achour | H01Q 5/0024 |
| 9,093,752 B2* | 7/2015 | Yarga | H01Q 5/328 |
| 9,157,930 B2* | 10/2015 | Nickel | G01R 1/06772 |
| 9,184,501 B2* | 11/2015 | Andrenko | H01Q 1/243 |
| 9,203,154 B2* | 12/2015 | Korva | H01Q 1/243 |
| 9,209,520 B2* | 12/2015 | Oon | H01Q 9/06 |
| 2001/0050643 A1* | 12/2001 | Egorov | H01Q 1/243 343/702 |
| 2002/0003497 A1* | 1/2002 | Gilbert | H01Q 1/38 343/700 MS |
| 2002/0177465 A1* | 11/2002 | Robinett | H04B 1/005 455/552.1 |
| 2004/0227678 A1* | 11/2004 | Sievenpiper | H01Q 1/243 343/702 |
| 2006/0152411 A1* | 7/2006 | Iguchi | H01Q 1/36 343/700 MS |
| 2006/0214857 A1* | 9/2006 | Ollikainen | H01Q 1/243 343/702 |
| 2007/0052595 A1* | 3/2007 | Harano | H01Q 1/244 343/702 |
| 2007/0222697 A1* | 9/2007 | Caimi | H01Q 1/243 343/861 |
| 2007/0225034 A1* | 9/2007 | Schmidt | H01Q 1/241 455/552.1 |
| 2007/0290859 A1* | 12/2007 | Held | G06K 7/10178 340/572.7 |
| 2008/0079642 A1* | 4/2008 | Ishizuka | H01Q 1/243 343/702 |
| 2008/0218427 A1* | 9/2008 | Dobosz | H04B 1/40 343/858 |
| 2008/0287084 A1* | 11/2008 | Krebs | H01Q 1/243 455/271 |
| 2009/0073068 A1* | 3/2009 | Eide | H01Q 1/3275 343/787 |
| 2009/0121948 A1* | 5/2009 | Nysen | H01Q 1/2275 343/702 |
| 2009/0152362 A1* | 6/2009 | Ayala | H01Q 1/2225 235/492 |
| 2009/0295567 A1* | 12/2009 | Bellows | H01Q 1/2216 340/539.11 |
| 2009/0322632 A1* | 12/2009 | Milosevic | H01Q 9/145 343/723 |
| 2010/0156472 A1* | 6/2010 | Pellon | H03M 1/662 327/105 |
| 2010/0321255 A1* | 12/2010 | Kough | H01Q 1/2266 343/702 |
| 2011/0051780 A1* | 3/2011 | Kawasaki | H04B 1/40 375/135 |
| 2011/0074641 A1* | 3/2011 | Sotoma | H01Q 1/243 343/702 |
| 2011/0163935 A1* | 7/2011 | de Jongh | H03H 7/40 343/861 |
| 2011/0181487 A1* | 7/2011 | Kim | H01Q 1/36 343/862 |
| 2011/0273353 A1* | 11/2011 | Achour | H01Q 5/0024 343/850 |
| 2012/0001826 A1* | 1/2012 | Achour | H01Q 5/0024 343/905 |
| 2012/0162533 A1* | 6/2012 | Milosevic | H01Q 9/145 348/725 |
| 2012/0262343 A1* | 10/2012 | Radojkovic | H01Q 9/42 343/702 |
| 2013/0034137 A1* | 2/2013 | Zuckerman | H04L 25/0278 375/222 |
| 2013/0154897 A1* | 6/2013 | Sorensen | H01Q 7/005 343/861 |
| 2013/0207856 A1* | 8/2013 | Oon | H01Q 9/06 343/749 |
| 2013/0283892 A1* | 10/2013 | Parker | G01N 22/00 73/61.49 |
| 2013/0307753 A1* | 11/2013 | Andrenko | H01Q 1/243 343/904 |

(56) References Cited

U.S. PATENT DOCUMENTS

| | | | |
|---|---|---|---|
| 2014/0049335 A1* | 2/2014 | Kroening | H01P 1/39 333/1.1 |
| 2014/0266939 A1* | 9/2014 | Baringer | H01Q 21/28 343/729 |
| 2014/0302797 A1* | 10/2014 | Han | H04W 24/06 455/67.14 |
| 2014/0307599 A1* | 10/2014 | Rousu | H04B 1/006 370/297 |
| 2015/0008767 A1* | 1/2015 | Shinoda | H01F 38/14 307/149 |
| 2015/0043623 A1* | 2/2015 | Kawasaki | H04B 1/40 375/219 |
| 2015/0066413 A1* | 3/2015 | Bhagat | G01R 33/3692 702/104 |
| 2015/0145734 A1* | 5/2015 | Caballero | H01Q 1/243 343/702 |
| 2015/0249479 A1* | 9/2015 | Nobbe | H04B 17/12 455/77 |
| 2015/0255869 A1* | 9/2015 | Sorensen | H01Q 7/005 455/77 |
| 2015/0311944 A1* | 10/2015 | Gollakota | H04B 1/40 375/219 |
| 2016/0036118 A1* | 2/2016 | Baringer | H01Q 1/22 343/702 |

* cited by examiner

HYBRID ANTENNA FOR PORTABLE RADIO COMMUNICATION DEVICES

FIELD OF THE DISCLOSURE

The present disclosure relates generally to antennas for radio devices, and more particularly to hybrid antennas that combine different types of antenna elements together in an antenna structure in order to reduce the overall size of the antenna structure.

BACKGROUND

Portable radio communication devices are widely used to facilitate communication among individuals and within organizations. Cellular phones, for example, are nearly ubiquitous in metropolitan regions around the world. These devices have become so popular that their design is influencing design approaches for other types of portable radio communication devices. One aspect of current cellular phone design that has become standard is the lack of an external antenna. Internal or hidden antennas are instead used for the various transceivers and receivers included in a typical "smart" phone device, and this is a feature that consumers have come to associate with a modern communication device.

Portable two-way radio devices, another type of portable radio communication device, are used to facilitate two-way (i.e. half duplex) radio communication with near instant communication access. These devices typically have a "push to talk" operation which allows a user to commence talking, and to be heard by others, at the push of a button. When a two-way radio device receives a signal on a monitored channel it can simply play received audio/voice signals over a loudspeaker, or a headset/earpiece at virtually the same time as it is being transmitted by the speaker's two-way radio device. Since two-way radio communication avoids delays present in cellular communication, it has persisted as a communication modality preferred by organizations such as police, fire/rescue, military, and other organizations where near-instant communication is essential.

The adoption of internal antennas in cellular phones, however, has been, in part, facilitated by the evolution of cellular protocols to higher frequencies. Conversely, standardized two-way radio communication is still conducted in Very High Frequency (VHF) bands, which is a much lower frequency than is used in cellular telephony communication. Since antenna size is inversely related to frequency, it has not been practical to adopt antenna designs used in cellular communication into two-way radio communication devices. However, eliminating, or substantially eliminating the conventional external antenna in two-way radio communication devices would be attractive to users of such devices for a number of reasons, including that it would make such devices easier to carry.

Accordingly, there is a need for an antenna structure that can be used in portable two-way radio devices that substantially eliminates or minimizes the need for an external antenna.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
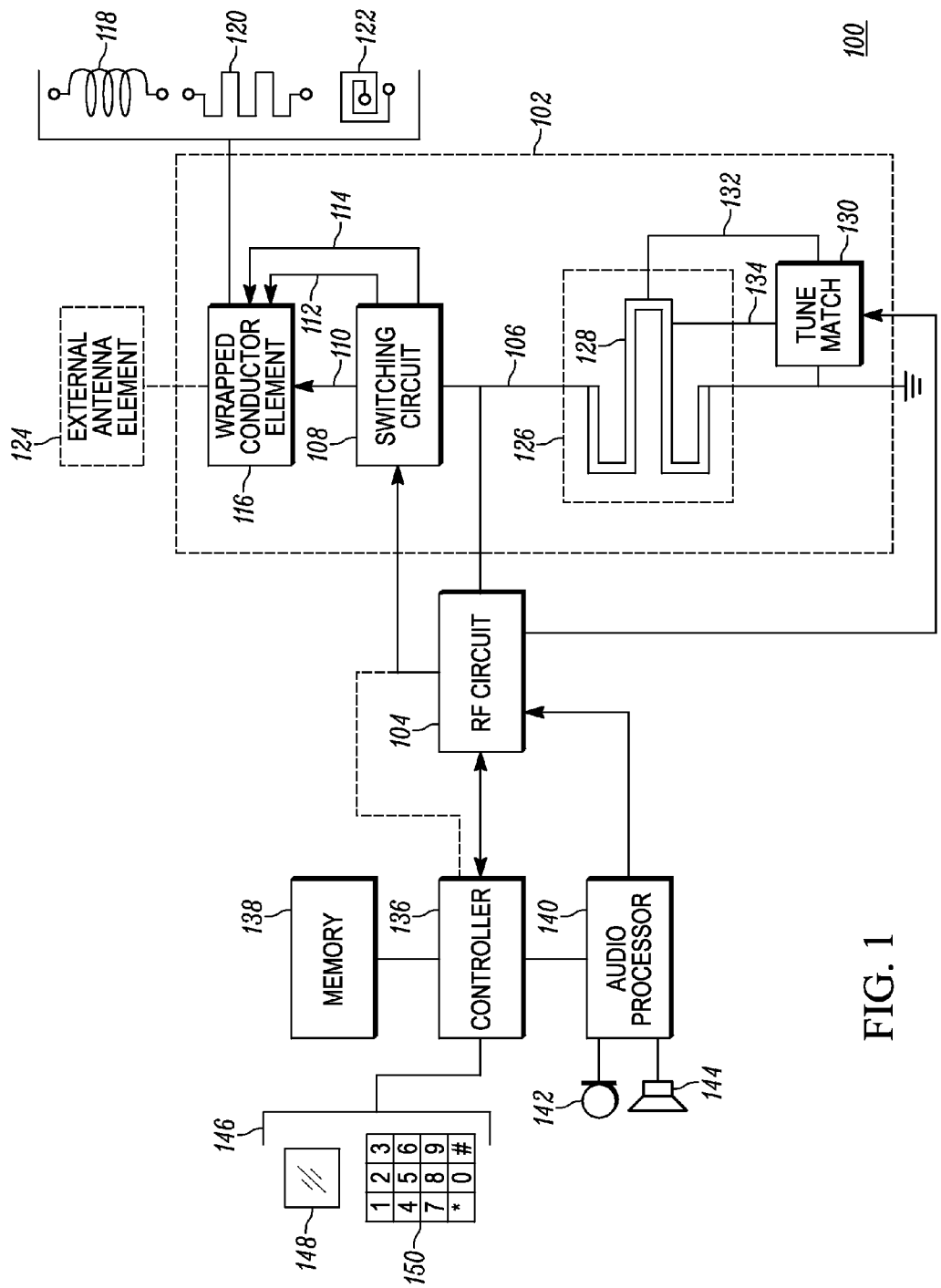
FIG. 1 is a block diagram of a portable radio communication device using a hybrid antenna structure in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a hybrid internal antenna structure suitable for use with a portable radio communication device. The hybrid antenna structure can include a feed line connected to a radio frequency (RF) circuit. A switching circuit can be included that has an input connected to the feed line and which has a plurality of selectable outputs. The switching circuit can be operable to connect the input to a selected one of the plurality of selectable outputs. The internal antenna structure can further include an inductive matching tail element connected between the feed line and a reference potential, and a wrapped conductor element having a plurality of tap points along a length of the wrapped conductor element Each of the plurality of selectable outputs is coupled exclusively to a respective one of the plurality of tap points.

FIG. 1 is a block diagram of a portable radio communication device 100 using a hybrid antenna structure 102 in accordance with some embodiments. The portable radio communication device 100 can be any type of radio communication device, including a device that only transmits radio signals, a device that only receives radio signals, or a device that both transmits and receives radio signals. In some embodiments the portable radio communication device 100 can be a portable two-way radio communication device such as those commonly used by public safety organizations (e.g. police, fire/rescue) and other organizations that desire near instant communication.

The hybrid antenna structure 102 is coupled to a radio frequency (RF) circuit 104, which can include an RF receiver, an RF transmitter, or both (transceiver). In some embodiments the RF circuit can operate in the Very High Frequency (VHF) band, which includes frequencies from 30 MHz to 300 MHz. The RF circuit 104 is coupled in particular to a feed line 106, which if further coupled to a switching circuit 108 and an inductive matching tail element 126. The feed line 106 is further coupled to a switching circuit 108 which is used to select a path 110, 112 or 114 through which to connect the feed line 106 to a wrapped conductor element 116. The wrapped conductor element 116 is a conductor having a path that alternates direction along the path (i.e. wrapping) to achieve a length directly from terminus to terminus that is shorter than its electrical length (i.e. along the path). Examples of wrapped conductor elements include, for example, a helical element 118, a meander element 120, and a spiral element 122. A helical element 118 is a conductor that winds around a space somewhat like the threads of a screw. A meander element 120 can be formed in a plane and portions of the meander element alternate direction in a "back and forth" pattern. A spiral element 122 can also be formed in a plane and generally winds around a central region, increasing or decreasing in diameter relative to the central region, depending on the direction traversed along the path of the spiral element 122. These elements 118, 120, 122 can be combined serially as well. Furthermore, a meander element 120 and a spiral element 122 can be formed in a flexible circuit board that can be curved or bent to fit into an interior space of the housing of a portable radio communication device 100, while the helical element 118 can be wound around a supporting member in the interior space of a portable radio communication device 100. The wrapped conductor element 116 can be further connected to an additional antenna element, such as an external antenna element 124.

The switching circuit 108 has an input connected to the feed line 106, and it has several outputs (i.e. 110, 112, 114) that each connect to a different tap point along the length of the wrapped conductor element 116 to achieve a different frequency response. Thus, as shown, the portable radio communication device 100 can be operable over three different bands with each band corresponding to a different tap point on the wrapped conductor element 116. When a user selects an operating frequency for the portable radio communication device 100, a controller 136 of the RF circuit 104 can configure the switching circuit 108 to connect the feed line 106 to the appropriate output 110, 112, 114 which are each connected to a different tap point along the length of the wrapped conductor element 116.

Likewise, the inductive matching tail element 126 can be tuned to match the selected frequency using a tuning circuit 130. The inductive matching tail element 126 includes a meander element 128 which is connected between the feed line 106 and a reference potential such as a ground potential. The tuning circuit 130 changes a matching impedance of the inductive matching element 126 based on the selected operating frequency of the RF circuit 104, and can be controlled by the controller 136 or the RF circuit 104. The tuning circuit 130 can be configured to connect different points along the meander element 128 to the reference potential to adjust its inductance value. The inductive matching tail element is used to match the capacitance presented to the feed line 106 by the hybrid antenna structure 102 as is common in electrically small antenna structures.

The controller 136 can be a microprocessor or microcontroller that is coupled to a memory 138 in which instruction code is stored or instantiated for execution by the controller 138. To facilitate voice and audio communication in some embodiments an audio processor 140 can be used to convert received acoustic signals (e.g. speech) that produce an analog signal at a microphone 142 into a format for transmission, which can include digitizing the analog signal produced by the microphone 142. Signals produced by the microphone in response to acoustic signals can be provided to the RF circuit 104 for transmission. Likewise, audio information received by the portable radio communication device that is encoded in a radio signal can be extracted from the radio signals by the RF circuit 104 and provided to the audio processor 140 to be played over a speaker 144. The controller 136 interfaces with a user interface 146 that can include elements such as a graphical display 148 for displaying information visually, a keypad 150, and other buttons/knobs to allow a user to enter information and make selections. When a user operates the portable radio device 100, the user can select an operating band (i.e. an RF band) or a channel that is in a particular band. Upon selecting a band or a channel, the portable radio device 100 configures switching circuit 108 and tuning circuit 130 accordingly to modify the electrical properties of the hybrid antenna structure 102 in accordance with the selected frequency band or channel. In some embodiments the external antenna element 124 can be used and can include a helical, whip, or other antenna element. Generally the external antenna element 124 is small enough to be considered a "stub," protruding from the portable radio device 100 only a small length, on the order of less than two inches, which is much shorter than a conventional VHF external antenna (i.e. where the entire antenna is located external to the portable radio device).

Figure 2:
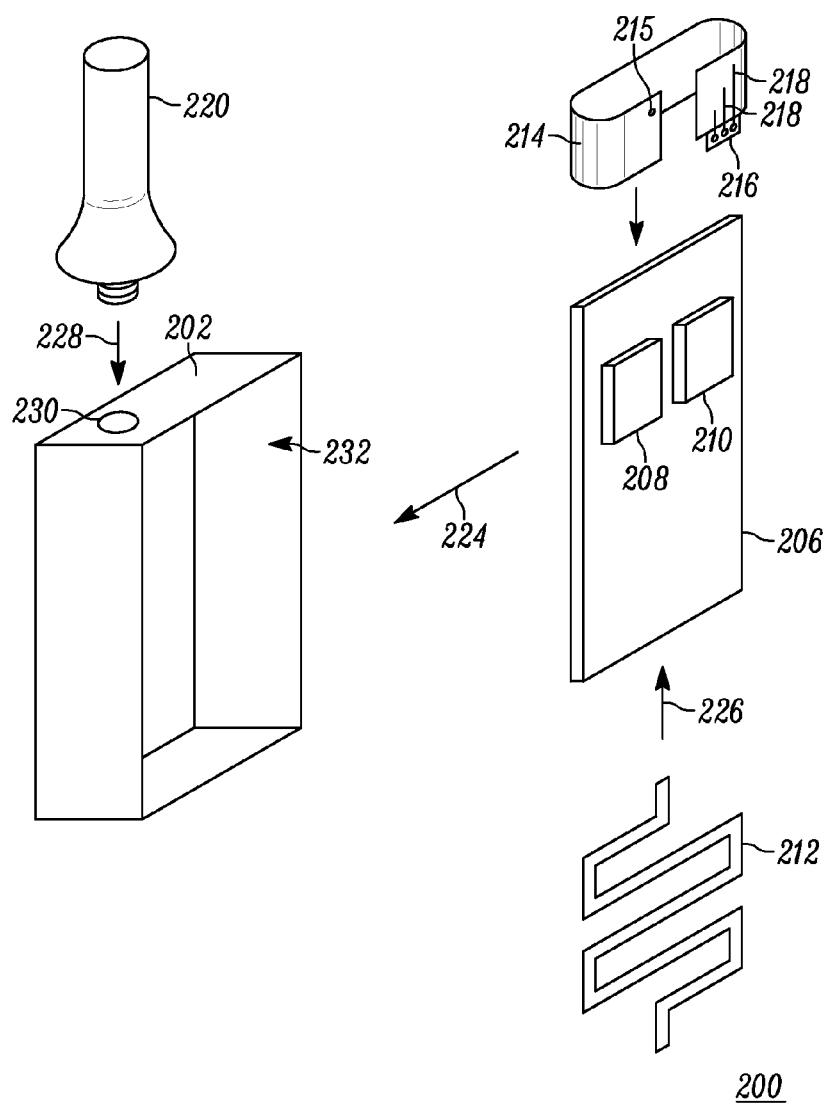
FIG. 2 is an exploded view of a portable radio communication device using a hybrid antenna in accordance with some embodiments.

FIG. 2 is an exploded view of a portable radio communication device 200 using a hybrid antenna in accordance with some embodiments. Those skilled in the art will appreciate that the exemplary view shown here is not intended to imply any particular manufacturing or assembly process and that a device 200 can be assembled in numerous ways without departing from the spirit and scope of the various embodiments. The portable radio communication device 200 includes a housing 202 in which the hybrid antenna structure and other circuitry and components are assembled. The housing 202 can be fabricated of polymeric material and forms an interior space 232 into which components are placed. Some circuitry for the portable radio communication device 200 can be placed on a circuit board 206 that can include an RF circuit 208 and a switching circuit 210, which can be comparable to RF circuit 104 and switching circuit 108, respectively, of FIG. 1. Accordingly, there will be a feed line between the RF circuit 208 and the switching circuit 210 to which an inductive matching tail element 212 is coupled, as indicated by arrow 226.

The switching circuit 210 contains switches that can be configured to connect the feed line to various locations on a wrapped conductor element 214, such as through a flexible circuit board connector 216. The flexible circuit board connector 216 can have several pads for connecting to corresponding outputs of the switching circuit 210, and conductors 218 that connect the pads to various locations or tap points on the wrapped conductor element 214. The wrapped conductor element 214 contains, for example, a meander element, a helical element, a spiral element, or combinations of those elements. In some embodiments the wrapped conductor element 214 can be formed in a flexible circuit board that is bent or turned from a flat configuration to conform to the interior periphery of the housing 202. In some embodiments the wrapped conductor element 214 itself can be wrapped around the circuit board 206 and other components assembled into the housing 202 of the portable radio communication device 200 to at least partially encircle the circuit board and/or other components. As such the wrapped conductor can be disposed around the inner periphery of the housing 202 (i.e. the inside surface). The wrapped conductor element 214 can have a termination point 215 that can be connected to an external antenna element 220 upon assembly of the portable radio communication device 200. The external antenna can be mounted in a port of electrical connector 230, as indicated by arrow 228, to connect to the termination point 215 of the wrapped conductor element 214. Thus, once assembled, the hybrid antenna structure, including the switching circuit 210, inductive matching tail element 212, and wrapped conductor element 214, are disposed in the interior 232 of the housing 202. The external antenna element 220 can be used to augment the effectiveness of the internal antenna structure for certain frequency bands.

Figure 3:
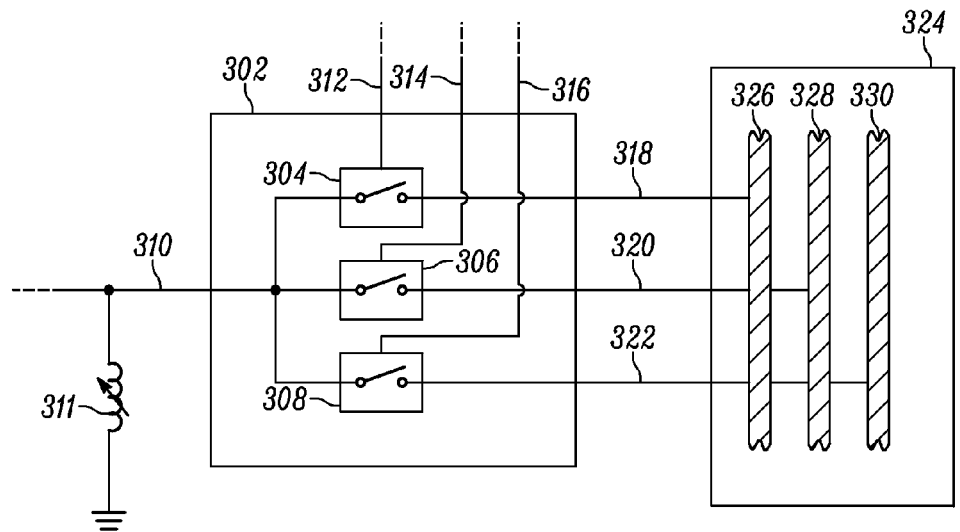
FIG. 3 is a schematic diagram of a switch circuit for selecting a tap point in a hybrid antenna in accordance with some embodiments.

FIG. 3 is a schematic diagram of a switch circuit 302 for selecting a tap point in a hybrid antenna 300, in accordance with some embodiments. The switch circuit 302 includes a plurality of switches or switch circuits 304, 306, 308. Each switch circuit 304, 306, 308 is connected to a common input 310, which can be a feed line such as feed line 106 of FIG. 1, and each switch circuit 304, 306, 308 has a unique output 318, 320, 322, respectively. Each switch circuit 304, 306, 308 is controlled by a respective enable line 312, 314, 316, which can be controlled by the RF circuit or a controller of the portable radio communication device. The input line 310 is also coupled to an inductive matching tail element 311, which is represented here as a lumped component but in actuality can be formed by a tunable meander element. Each output 318, 320, 322 is connected to the wrapped conductor element 324 at a different location along a length of the wrapped conductor element 324. The wrapped conductor 324 shown here is broken into three portions 326, 328, 330, which represent different portions along the length of the wrapped conductor element 324, and which are electrically connected contiguously along a path length of wrapped conductor 324. Accordingly, output 318 can be connected to a tap point on portion 326, which can be an initial or starting portion of the wrapped conductor element 324. Output 320 can be connected to a tap point on portion 328, which can be a first intermediate portion after the initial portion along the length of wrapped conductor 324. Output 322 can be connected to a tap point on portion 330, which can be a second intermediate portion after the initial and first intermediate portions along the length of wrapped conductor element 324.

By connecting the input 310 to different tap points along the wrapped conductor 324, the resulting frequency response of the hybrid antenna structure 300 can be changed selectively. So each of switch circuit 304, 306, and 308 can be selectively switched on in accordance with a selected operating frequency band. The switch circuits 304, 306, 308 can be implemented by PIN diodes, micro-electromechanical switches (MEMS), transistors, and so on, as will be apparent to those of skill in the art.

Figure 4:
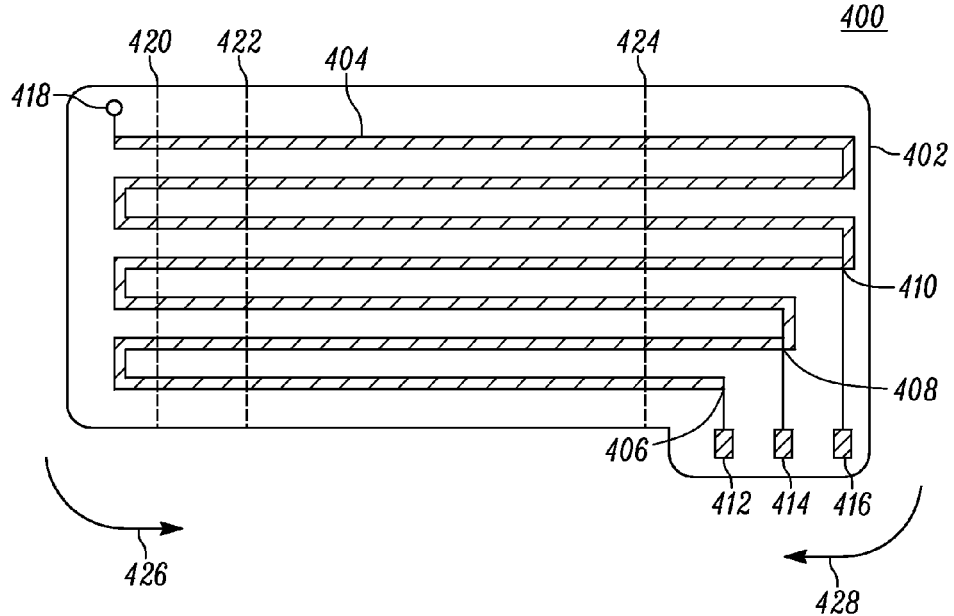
FIG. 4 is a wrapped conductor element having a meander element with multiple selectable tap points in accordance with some embodiments.

FIG. 4 is a wrapped conductor element 400 having a meander element with multiple selectable tap points in accordance with some embodiments. The wrapped conductor element 400 can be fabricated on a substrate 402, which can be a circuit board or a flexible circuit board. A conductor 404 is disposed on the substrate 402 in a meander shape between a first terminus 406 and a second terminus 418. In general the conductor 404 follows a path that alternates right to left, then left to right (as viewed on the page), advancing in a direction generally perpendicular (up the page in this example) to the direction of each right/left meander segment. Thus, the distance directly from the first terminus 406 to the second terminus 418 (i.e. a straight line between them) is substantially shorter than the length along the path of the meander. A first pad 412 can be connected to first output of a switch circuit (not shown) and further connected to a first tap point at the first terminus 406. A second pad 414 can be connected to a second output of the switch circuit and further connected to a tap point at a first intermediate point 408 along the meander element. A third pad 416 can be connected to a third output of the switch circuit and further connected to a tap point at a second intermediate point 410 along the meander element. The frequency response at different locations along the meander element differs, thus a point corresponding to a desired frequency band is selected for each tap point. More or less than three tap points can be chosen, along with a respective number of outputs of the corresponding switch circuit, if more or less than three frequency bands are to be used by the portable radio communication device. In some embodiments the wrapped conductor element 400 can be implemented on a flexible circuit board which can be bent, curved, or folded along lines 420, 422, 424, for example, as indicated by arrows 426, 428, to form the flexible circuit board around the interior periphery of the portable radio communication device. An external antenna element can be connected to the second terminus 418.

Figure 5:
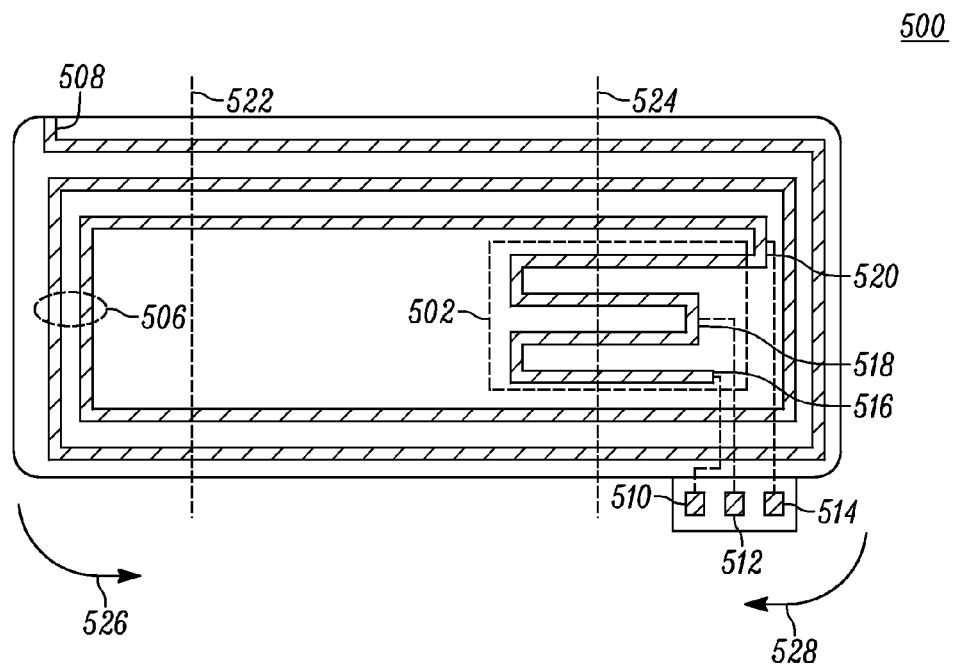
FIG. 5 is a wrapped antenna element having a meander element and a spiral element with multiple selectable tap points in accordance with some embodiments.

FIG. 5 is a wrapped antenna element 500 having a meander element 502 and a spiral element with multiple selectable tap points in accordance with some embodiments. The meander element 502 comprises portion of a conductor trace disposed on a substrate (or simply a metal piece that supports itself) in a meander shape. The meander portion is shown electrically connected in series with a spiral element that spirals around a central region with spiral segments 506. As shown, the meander portion 502 in in the interior of the spiral portion in accordance with some embodiments, and the spiral portion spirals around the meander portion to a terminus 508 which can be connected to an external antenna element. Three pads 510, 512, 514 can be used to connect corresponding outputs of a switch circuit to a first tap point 516, a second tap point 518, or a third tap point 520, respectively, where each tap point 516, 518, 520 correspond to different frequency responses for different operating frequencies or frequency bands. As in FIG. 4 the wrapped conductor element 500 can be formed on a flexible circuit board and bent or curved around line 522, 524, in the direction of arrows 526, 528, respectively, to form the wrapped conductor element 500 around the inside of a portable radio communication device.

Figure 6:
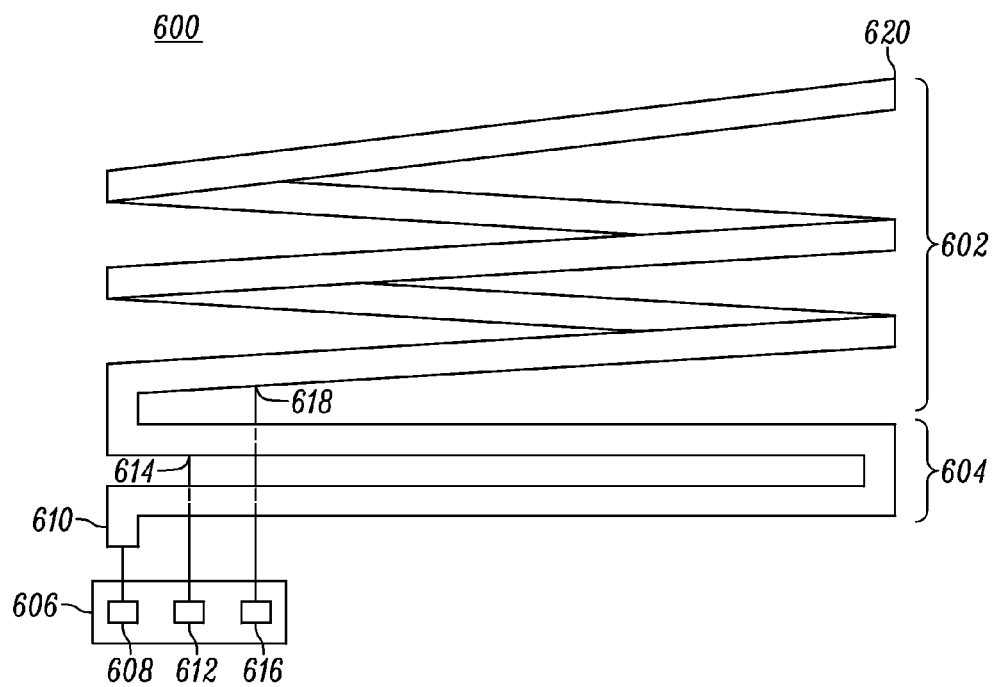
FIG. 6 is a wrapped antenna element having a meander element and a helical element with multiple selectable tap points in accordance with some embodiments.

FIG. 6 is a wrapped antenna element 600 having a meander element 604 and a helical element 602 with multiple selectable tap points in accordance with some embodiments. A circuit element 606 can be used to connect pads 608, 612, and 616 to tap points 610, 614, 618, respectively. Pads 608, 612, and 626 can be further connected to corresponding outputs of a switching circuit. Each tap point 610, 614, or 618 can be selected through the switching circuit for a desired operating frequency. Unlike meander and spiral elements, the helical element 602 is wound around a space, such around a supporting member which can be hollow so as to allow the assembly of circuitry and other components inside the center portion of the helical element 602. A terminus 620 can be connected to an external antenna element (or any other antenna element, including another wrapped conductor section).

In FIGS. 4-6 various exemplary embodiments of wrapped conductor elements are shown. These are not meant to represent the entirety of possible forms, designs, and shapes of wrapped conductor elements, and numerous other forms of wrapped conductor elements and combinations of wrapped conductor elements can occur to those skilled in the art. A wrapped conductor element is used to provide and electrically long path in a physically short space, the terms "long" and "short" being relative here. Furthermore, to achieve the desired frequency response, the wrapped conductor element is tapped at different points for connection, though a switching circuit, to a feed line (which can operate for transmitting, receiving, or both). Since the conductor (i.e. the metal) in a wrapped conductor element has portions of the conductor near other portions of the conductor, a wrapped conductor element presents more capacitance at the feed line point than, for example, a straight whip monopole antenna element. Accordingly, to match the load of the hybrid antenna at the feed line, an inductive matching tail element is used that is connected between the feed line and a reference potential. Since the frequency response of the wrapped conductor element is selected in correspondence with a selected frequency or frequency band, the inductive matching tail element can be tuned accordingly (i.e. by bypassing sections of the meander used to implement the inductive matching tail element) to maintain a proper impedance match at the feed line.

Figure 7:
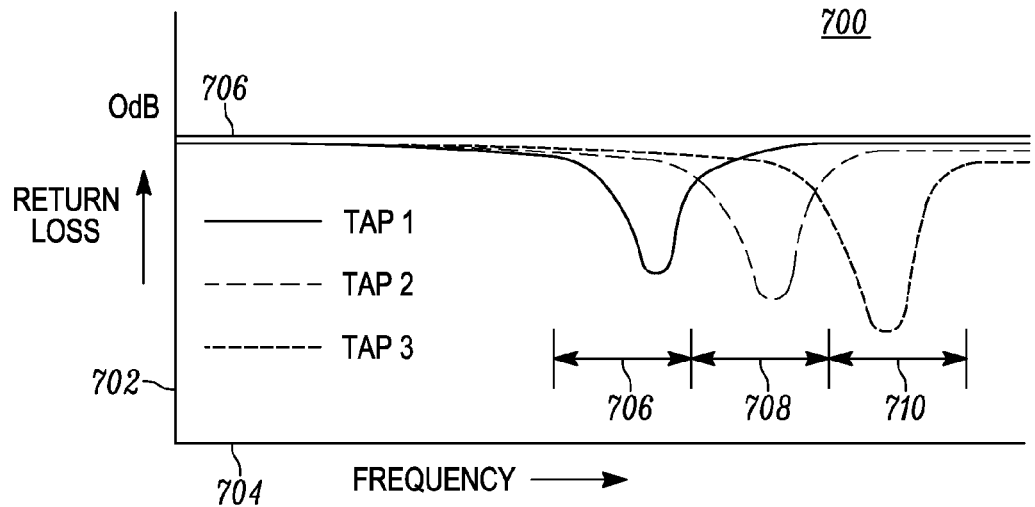
FIG. 7 is a return loss plot versus frequency showing the effect of selecting different tap points in a hybrid antenna in accordance with some embodiments.

FIG. 7 is a graph 700 of return loss versus frequency, showing the effect of selecting different tap points in a hybrid antenna, in accordance with some embodiments. Return loss is graphed along the vertical axis 702 while frequency is graphed along the horizontal axis 704. The 0 decibel (dB) line 706 is approximately two thirds of the way up the vertical axis 702. There are three different plots on the graph represented by a solid line, a dotted line, and a dashed line. Each plot represents selection of a different tap point in a wrapped conductor such as those discussed in reference to FIGS. 1-6. For example, the solid line represents the frequency response from the feed line for selection of a first tap point, the dotted line represents the frequency response from the feed line for selection of a second tap point, and the dashed line represents the frequency response from the feed line for selection of a third tap point. Selection of the first tap point corresponds to a first frequency band 706, selection of the second tap point corresponds to a second frequency band 708, and selection of the third tap point correspond to a third frequency band 710. Thus, for example, if the user of the portable radio communication device selects an operating frequency in the second frequency band 708, the switching circuit will be configured to connect the feed line to the second tap point. A frequency selection in the first band will result in the switching circuit being configured to connect the feed line to the first tap point, and so on.

Figure 8:
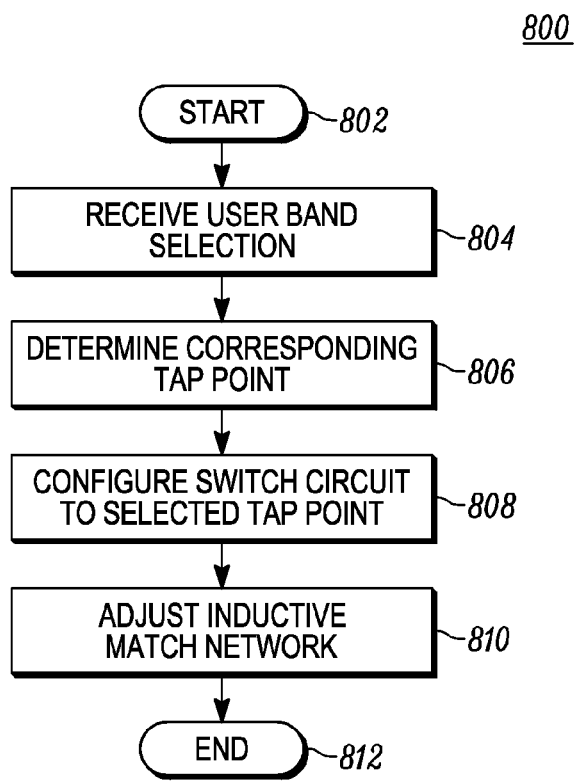
FIG. 8 is a flow chart diagram of a method of operating a hybrid antenna in accordance with some embodiments.

FIG. 8 is a flow chart diagram of a method 800 of operating a hybrid antenna in a portable radio communication device, in accordance with some embodiments. At the start 802, the portable radio communication device is powered on and ready for operation. Commencing in step 804, the user can select or indicate a desired frequency of operation. The frequency selection can be performed by, for example, manipulating a frequency dial or knob, entering a channel number in a graphical user interface, selecting an organization from a list of organizations in a graphical user interface, and so on. Upon receiving the indication of the selected frequency from the user, the portable radio communication device determines the corresponding tap point in step 806. For example, the first, second, and third bands 706, 708, and 710, respectively, in FIG. 7 can be represented in a memory of the portable radio communication device by the boundary frequencies of each band. When a user indicates a frequency, directly or indirectly, the portable communication device can map that frequency into one of the bands, and select the corresponding tap point. Once the corresponding tap point is determined, the portable radio communication device then configures the switching circuit in step 808 to connect the RF circuit, via a feed line, to the corresponding tap point of the wrapped conductor element. In order to preserve the proper impedance match, in step 810 the inductive matching tail element is likewise tuned by adjusting the inductance coupled to the feed line. The method ends at step 812 and the portable radio communication device can then commence radio communication. The method 800 can be repeated when the user desires to operate on a different frequency.

The embodiments provide the benefit of a compact antenna structure that can be used entirely, or almost entirely, within a portable radio communication device operating in VHF frequency bands, which allows manufacturers to design portable radio communications devices for operating in the VHF range using design styles that are familiar, and preferable to present day users. Conventional antenna designs, such as an external wideband whip type monopole, can be avoided by use of a wrapped conductor that is tapped at various points along the electrical length of the wrapped conductor element. Various wrapped conductor element designs are available that can be used in accordance with the embodiments. Tap points along the length of the wrapped conductor element can be determined empirically, based on desired frequency response for various operating frequency bands.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An internal antenna structure for a portable radio communication device, comprising:
   a feed line connected to a radio frequency (RF) circuit;
   a switching circuit having an input connected to the feed line and having a plurality of selectable outputs, the switching circuit is operable to connect the input to a selected one of the plurality of selectable outputs;
   an inductive matching tail element connected between the feed line and a reference potential; and
   a wrapped conductor element having a plurality of tap points along a length of the wrapped conductor element;
   wherein each of the plurality of selectable outputs of the switching circuit is coupled exclusively to a respective one of the plurality of tap points.

2. The internal antenna structure of claim 1, wherein the inductive matching tail element is a conductor having a meander shape.

3. The internal antenna structure of claim 1, wherein the wrapped conductor element comprises a meander element.

4. The internal antenna structure of claim 1, wherein the wrapped conductor element comprises a helical element coupled to the meander element.

5. The internal antenna structure of claim 1, wherein the wrapped conductor element comprises a meander element coupled to a spiral element.

6. The internal antenna structure of claim 1, wherein the wrapped conductor element is formed in a flexible circuit board that is wrapped around an internal space of the portable radio communication device.

7. The internal antenna structure of claim 1, wherein the switching circuit connects the input to the selected one of the plurality of selectable outputs based on a selected operating frequency of the RF circuit.

8. The internal antenna structure of claim 7, wherein the selected operating frequency is a frequency band from 30 MHz to 300 MHz.

9. The internal antenna structure of claim 1, wherein the wrapped conductor element has a termination connected to an external antenna element.

10. The internal antenna structure of claim 1, wherein the inductive matching tail element is connected to the reference potential through a tuning circuit that changes a matching impedance of the inductive matching element based on an operating frequency of the RF circuit.

11. A method of operating a portable radio communication device, comprising:
    receiving an indication of a selected operating frequency;
    determining a switching configuration for a switching circuit having an input connected to a radio frequency (RF) circuit via a feed line and a plurality of outputs, each one of the plurality of outputs connected to a respective tap point along a length of a wrapped conductor, wherein each tap point corresponds to a frequency band;
    configuring the switching circuit to connect the feed line to a tap point corresponding to the selected operating frequency range; and
    adjusting an inductive matching tail element connected between the feed line and a reference potential based on the selected operating frequency.

12. The method of claim 11, wherein receiving the indication of the selected operating frequency comprises receiving a channel section via a user interface of the portable radio communication device.

13. The method of claim 11, wherein configuring the switching circuit comprises configuring the switching circuit to connect the feed line to a tap point on a meander element of the wrapped conductor element.

14. A portable radio communication device, comprising:
    a housing;
    a circuit board disposed in the housing;
    a wrapped conductor element disposed around an inner periphery of the housing so as to at least partially encircle a portion of the circuit board;
    a radio frequency (RF) circuit connected to a feed line;
    a switching circuit that selectively connects the feed line to one of a plurality of tap points along a length of the wrapped conductor element, wherein each tap point corresponds to a different frequency band; and
    an inductive matching tail element connected between the feed line and a reference potential, and wherein the inductive matching tail element is selectively tuned in correspondence with a selection of one of the plurality of tap points.

15. The portable radio communication device of claim 14, wherein the inductive matching tail element is a conductor having a meander shape.

16. The portable radio communication device of claim 14, wherein the wrapped conductor element comprises a meander element formed on a flexible circuit board member.

17. The portable radio communication device of claim 14, wherein the wrapped conductor element comprises a helical element coupled to the meander element, wherein the helical element and the meander element are formed on a substrate that fits around the inner periphery of the housing.

18. The portable radio communication device of claim 14, wherein the wrapped conductor element comprises a meander element coupled to a spiral element, wherein the spiral element and the meander element are formed on a flexible circuit board member.

19. The portable radio communication device of claim 14, wherein the switching circuit connects the input to the selected one of the plurality of selectable outputs based on a selected operating frequency of the RF circuit.

20. The portable radio communication device of claim 14, wherein the wrapped conductor element has a termination connected to an external antenna element.

* * * * *